W. J. LYNCH.
DISH HOLDING TRAY OR BASKET.
APPLICATION FILED MAY 19, 1920.
1,371,253.
Patented Mar. 15, 1921.
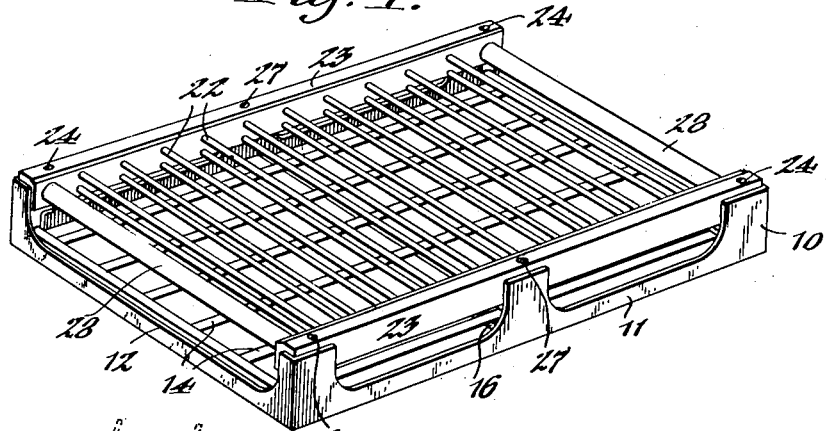
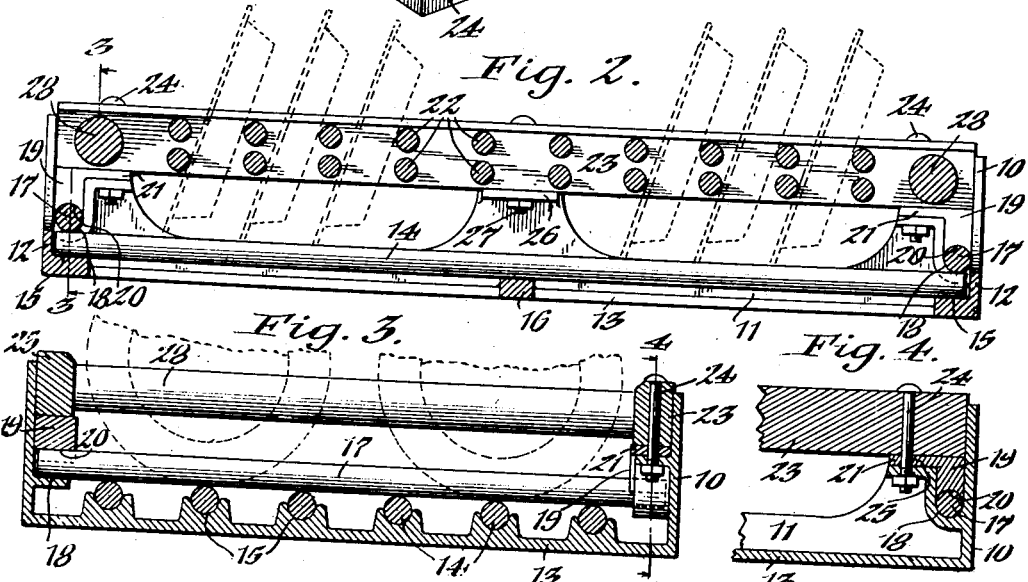
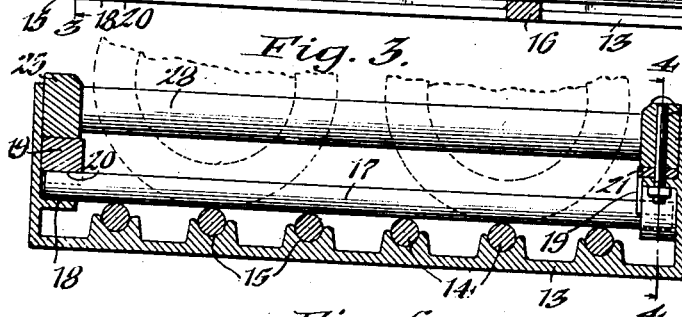
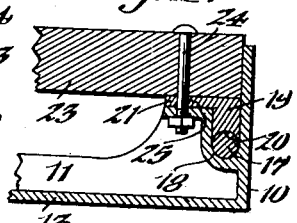
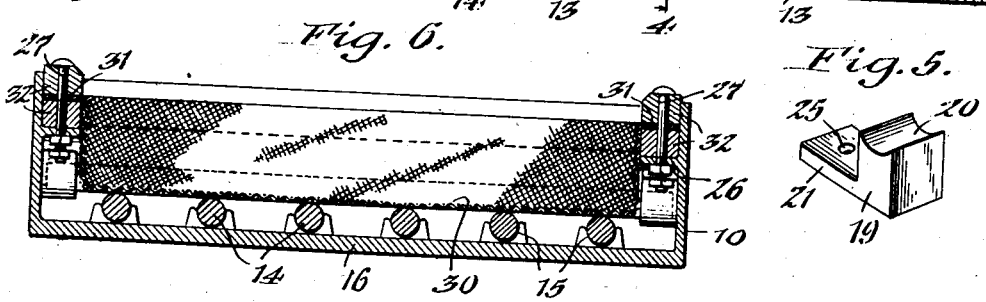
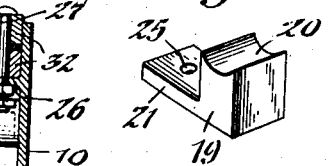
Inventor,
William J. Lynch
by [signature]
Attorneys.

UNITED STATES PATENT OFFICE.

WILLIAM J. LYNCH, OF BUFFALO, NEW YORK.

DISH-HOLDING TRAY OR BASKET.

1,371,253.

Specification of Letters Patent.  Patented Mar. 15, 1921.

Application filed May 19, 1920. Serial No. 382,492.

*To all whom it may concern:*

Be it known that I, WILLIAM J. LYNCH, a citizen of the United States, residing in Buffalo, in the county of Erie and State of New York, have invented new and useful Improvements in Dish-Holding Trays or Baskets, of which the following is a specification.

This invention relates to a dish holding tray or basket which is more particularly adapted for use in connection with dish washing machines and the like.

One of the objects of this invention is to produce a tray of this character which is simple, yet strong and durable in construction.

A further object is to construct a tray having upper and lower dish supporting racks which are readily removable and applicable to frames of different heights to suit dishes of various sizes.

A still further object is to provide improved means for removably securing the upper and lower racks to the basket frame.

In the accompanying drawings:

Figure 1 is a perspective view of my improved dish holding tray or basket. Fig. 2 is a central longitudinal section thereof, on an enlarged scale. Fig. 3 is a cross section thereof taken approximately on line 3—3, Fig. 2. Fig. 4 is a fragmentary vertical longitudinal section on line 4—4, Fig. 3. Fig. 5 is an inverted perspective view of the clamping member for holding the lower racks in place. Fig. 6 is a cross section showing a modified form of receptacle for silver as applied to the basket frame.

Similar characters of reference refer to like parts throughout the several views.

In its general organization this dish holding tray or basket comprises a main frame or holder having a removable lower rack or grate for supporting the dishes edgewise and a removable upper rack for supporting the dishes at their sides and holding the same in a substantially upright position.

Referring more particularly to Figs. 1–5, 10 represents the main frame or holder which may be of any suitable form and construction, but is preferably of skeleton-like form and rectangular in shape and cast in one piece. This frame is open at its top and bottom, and is provided with comparatively shallow side and end walls 11, 12, respectively, and a horizontal marginal base flange 13 extending inwardly from the side and end walls.

The lower rack or grate for supporting the dishes edgewise is arranged in the bottom of the frame 10 and preferably comprises a plurality of spaced longitudinal bars 14 removably supported at their opposite ends in concave recesses 15 formed in the upper sides of the opposite end portions of the base flanges 13. These bars are also supported centrally thereof by a transverse rail 16 integrally connected to the opposite sides of the frame, which prevents the bars from bending due to the weight of the dishes resting thereon. Longitudinal displacement of the bars 14 is prevented by the end walls 12 of the frame. 17, 17 represent transverse members removably arranged at the opposite ends of the frame 10 and which engage the adjacent upper ends of the several longitudinal bars 14. These members are seated at their opposite ends in recesses 18 open at their upper ends and arranged on the inner side walls of the main frame adjacent the corners thereof. The opposite ends of the transverse members are removably held in place by clamping members 19, which are preferably in the form of L-shaped blocks, as shown in Fig. 5, each having a concave seat 20 which engages the corresponding upper side of each transverse member and an attaching ear or lug 21 for suitably securing the same to the adjacent portion of the frame 10. By this construction and arrangement, the longitudinal supporting bars 14 are reliably held against lateral and longitudinal displacement as well as vertical displacement and yet may be conveniently removed from the frame when desired.

The upper rack for supporting the dishes at their sides to hold the same in a substantially upright position is removably arranged in the upper part of the frame and preferably comprises a plurality of spaced parallel transverse bars 22 mounted at their opposite ends in longitudinal side rails or members 23 removably secured to said frame. These side rails are preferably secured to this frame by bolts 24 or similar fastenings which also pass through openings 25 in the attaching lugs 21 of the clamping members 19, thereby reliably securing both the upper and lower racks to said frame by the same fastenings and eliminating the necessity of employing separate fastenings for each rack. If desired, the rails 23 may be supported centrally thereof on brackets 26 provided on the inner side of the side walls of the frame and secured thereto by bolts 27. As shown in the drawings, the transverse bars 22 are preferably arranged in sets of two, the bars of each set being disposed in vertical alinement or nearly so with one another.

Connecting the opposite ends of the side rails 23 of the upper rack are handles 28 which permit of convenient handling of the tray.

The dishes to be washed are inserted between the transverse bars 22 of the upper rack with their lower edges resting on the longitudinal bars 14 of the lower rack, while they are supported at their front and rear sides by the said transverse bars, the latter being arranged at comparatively close intervals and effectively preventing the dishes from falling between them and dropping on the lower rack.

By this arrangement, a dish holding tray is provided which permits of thoroughly washing the dishes therein as they pass through a dish washing machine and being free from contact with one another, the dishes are less liable to breakage.

By providing removable upper and lower supporting racks of this character, the same are readily applicable to frames of different heights, the disposition of the upper rack with reference to the lower rack depending on the particular size of the dishes to be supported, and the recessed portions of the clamping members being correspondingly lengthened or shortened accordingly.

In Fig. 6 is shown a modified form of upper rack for supporting knives, forks, spoons and other small articles. In the construction shown, the rack is in the form of a receptacle or container 30, constructed of wire screening or similar material, being open at its top and having a bottom, side and end walls. The upper ends of the side walls of the receptacles are provided with outwardly extending marginal flanges 31 each of which is secured between the opposing faces of a pair of superposed side rails 32, 32 removably secured at their opposite ends to the frame 10. In using this receptacle, the lower rack, as described in the previous construction, remains in the frame, it only being necessary to substitute the modified form of receptacle for the upper dish supporting rack.

I claim as my invention:

1. A dish holding tray comprising a main frame, longitudinal bars supported in the lower portion of said frame, transverse end members disposed above the plane of said longitudinal bars, said members being removably secured to said frame and engaging the upper sides of said bars, and a dish supporting rack disposed above the latter and removably secured to said frame.

2. A dish holding tray comprising a main frame, longitudinal bars supported in the lower portion of said frame, transverse end members supported by said frame and engaging the upper sides of said longitudinal bars, longitudinal side members arranged in the upper portion of said frame, dish supporting means carried by said side members, and unitary means for removably securing said transverse end members and said longitudinal side members to said frame.

3. A dish holding tray comprising a main frame, longitudinal bars supported at their opposite ends in said frame, transverse end members disposed above the plane of said bars, said members being removably secured to said frame and engaging the upper sides of said longitudinal bars, clamping members engaging the ends of the transverse members, a supporting rack disposed above said clamping members, and means for removably securing the latter and said rack to said frame.

4. A dish holding tray comprising a main frame having a base flange at its opposite ends and recesses arranged in said base flange, longitudinal bars supported at their ends in said recesses, transverse end members removably secured to said frame and engaging the upper sides of said longitudinal bars, clamping members removably mounted on said frame and engaging the upper sides of said transverse members, and a supporting rack disposed above said clamping members and removably secured to said frame.

5. A dish holding tray comprising a main frame having a base flange at its opposite ends and recesses arranged in said base flange, longitudinal bars supported at their ends in said recesses, transverse end members supported at their opposite ends on said frame and engaging the upper sides of said longitudinal bars, and clamping members having recessed portions for engaging the upper sides of said transverse members and attaching lugs for removably securing said clamping members to said frame.

WILLIAM J. LYNCH.